United States Patent [19]
Ripley

[11] Patent Number: 5,358,323
[45] Date of Patent: Oct. 25, 1994

[54] CONSOLE WITH SNAP FIT END CAPS

[75] Inventor: Brian Ripley, Webster City, Iowa

[73] Assignee: White Consolidated Industries, Inc., Cleveland, Ohio

[21] Appl. No.: 203,660

[22] Filed: Feb. 28, 1994

Related U.S. Application Data

[63] Continuation of Ser. No. 890,672, May 29, 1992, abandoned.

[51] Int. Cl.⁵ ............................................. A47B 47/00
[52] U.S. Cl. .................................. 312/228; 312/263; 403/315; 403/335
[58] Field of Search ................ 312/228, 257.1, 223.1, 312/263, 265.5; 403/315, 319, 289, 335, 248, 246

[56] References Cited

U.S. PATENT DOCUMENTS

| | | |
|---|---|---|
| 3,253,874 | 5/1966 | Czech ................................. 312/228 |
| 3,347,609 | 10/1967 | Mann ................................ 312/257.1 |
| 3,995,922 | 12/1976 | Ohashi ............................... 312/263 |
| 4,003,613 | 1/1977 | Oakley . |
| 4,277,122 | 7/1981 | Borgile .............................. 312/263 |
| 4,288,133 | 9/1981 | Deatherage . |
| 4,732,431 | 3/1988 | Mason ............................. 312/257.1 |
| 4,765,698 | 8/1988 | Dooley . |
| 4,798,424 | 1/1989 | Coates et al. . |
| 5,013,105 | 5/1991 | Rossum ........................... 312/257.1 |

FOREIGN PATENT DOCUMENTS 2249483 10/1972 Fed. Rep. of Germany ...... 312/228

Primary Examiner—Flemming Saether
Attorney, Agent, or Firm—Pearne, Gordon, McCoy & Granger

[57] ABSTRACT

The present invention relates to a snap fit end cap for a control console positioned within a domestic appliance, particularly a washing or drying machine. Each of the end caps include mounting pins which extend through and support the control console. A stop surface is provided adjacent the mounting pins to limit the penetration of the pins into the control console and to prevent inward movement of the end cap relative to the control console. Resilient fastening devices are also provided by the end caps. The fastening devices extend through apertures provided by the control console, a shoulder surface of the fastening devices engaging an inner surface of the control console to prevent removal of the fastening device once installed therein as well as to prevent outward movement of the end cap relative to the control console. The distance between the shoulder surface and the stop surface is generally equal to the thickness of the control console, trapping the console therebetween and preventing the end cap from moving relatively towards or away from the control console. The end caps of the present invention eliminate or otherwise greatly reduce the amount of labor and hardware necessary to attach the end caps to the control console of the appliance.

12 Claims, 2 Drawing Sheets

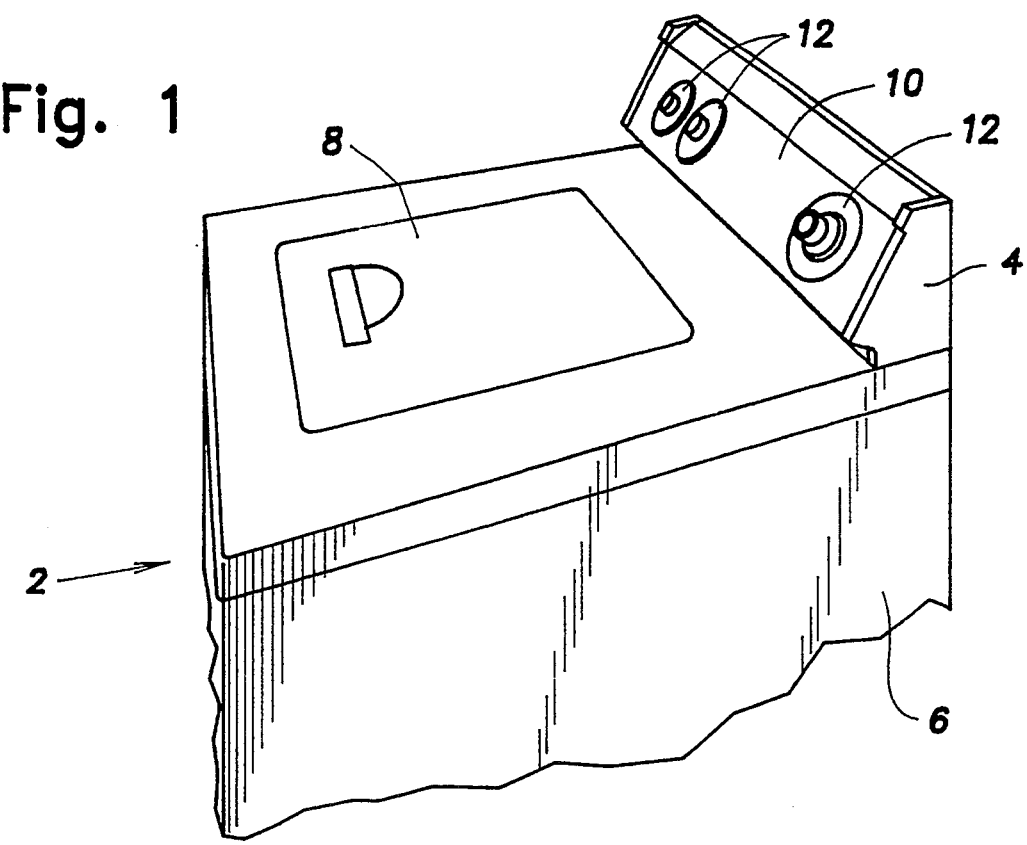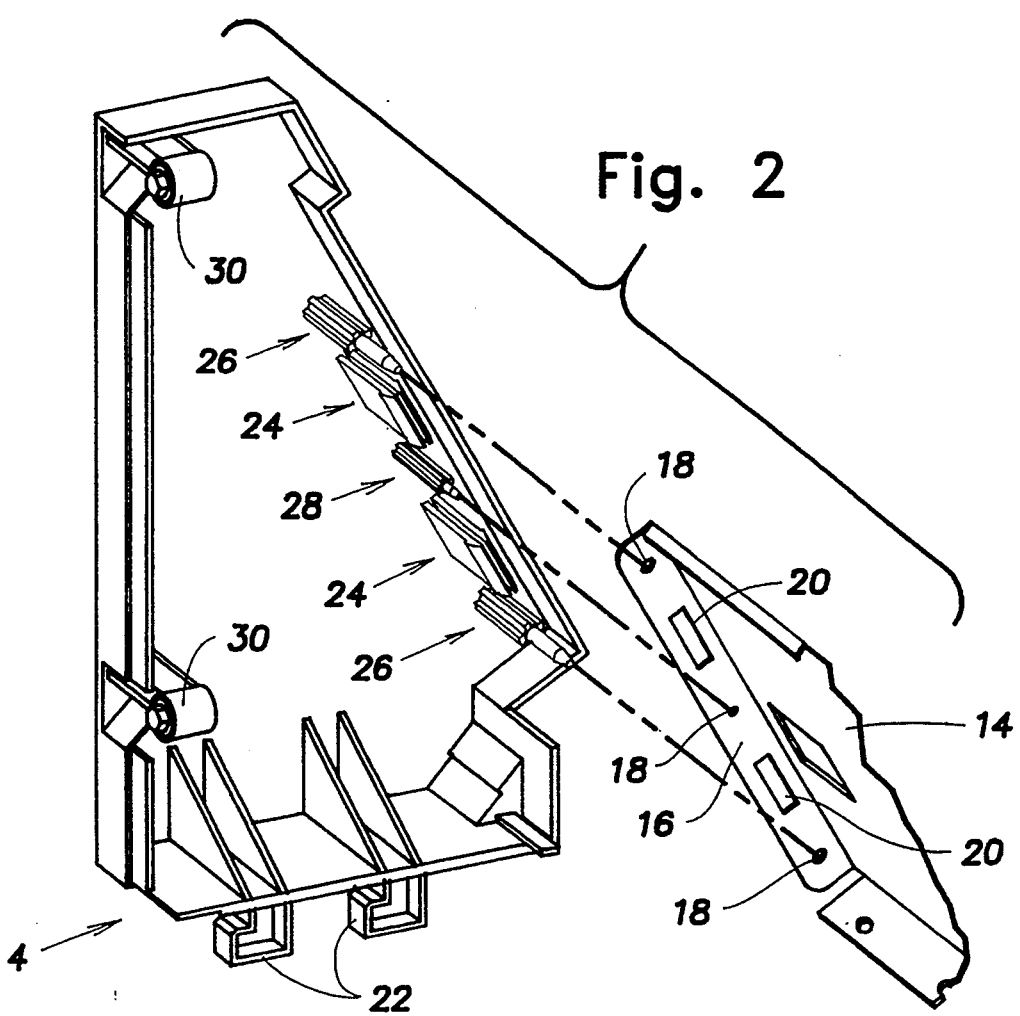

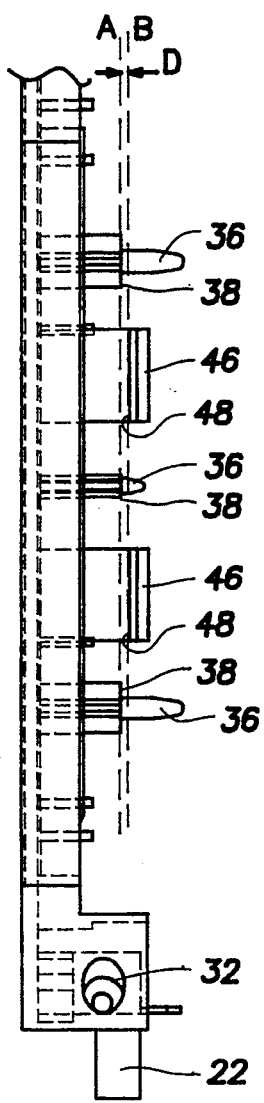
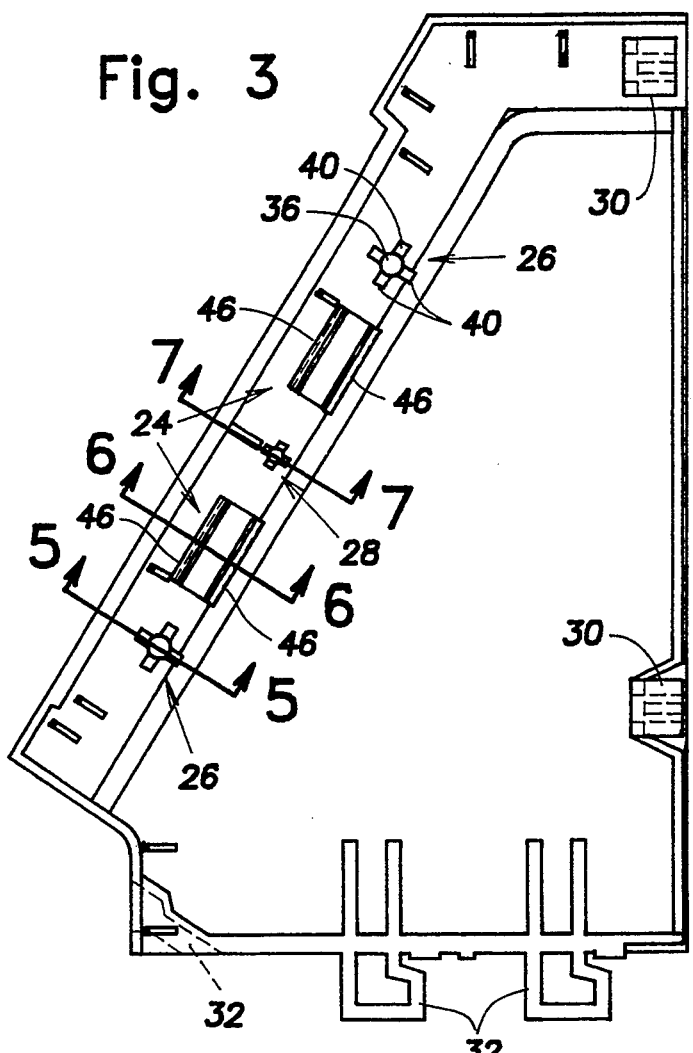
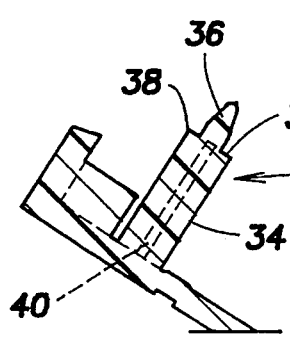
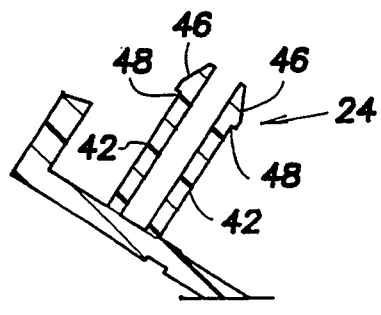

CONSOLE WITH SNAP FIT END CAPS

This is a continuation of application Ser. No. 07/890,672, filed May 29, 1992, now abandoned.

BACKGROUND OF THE INVENTION

1. Field of the Invention

The present invention generally relates to appliances and, more particularly, to end caps for control consoles for use with such appliances.

2Description of Related Art

In electrical appliances, such as washers and dryers, the electrical controls are provided on a control console carried on the upper portion of the rear of the appliance cabinet. The console provides a housing structure for the mounting of control elements, such as rotary knobs, switches, push buttons and the like, which extend out of the control console and are readily manipulated by the user of the appliance.

The control console is conventionally mounted between a pair of end caps which are, in turn, mounted to the top of the appliance cabinet. The end caps known in the art tend to be two-piece assemblies, and require independent fastening means to attach the control console thereto. U.S. Pat. No. 4,003,613 is exemplary of this type of end cap.

The '613 patent discloses a two piece end cap including a base or bottom part which is mounted to the top surface of the appliance cabinet by conventional tongue and groove mounting means. The top part of the end cap provides a series of mounting flanges or extensions which project into slots provided by the bottom part to interconnect the two parts. The bottom part of the end cap provides inwardly extending posts which are positioned adjacent a flange of the control console and attached thereto by means of screws. U.S. Pat. Nos. 4,798,424; and 4,765,698 disclose similar end cap constructions.

U.S. Pat. No. 4,288,133 discloses an end cap which is used to form a uniform corner for the appliance cabinet. A control housing provides rear and side walls, and the end cap is attached to the front portion of each the side walls. The end cap is used to secure the control and decorative panels to the control housing by means of conventional fastening means.

In all the end caps known in the art, additional independent fastening means are required in order to mount the end caps to the control console. The use of additional fastening means increases both cost and assembly time. Therefore, there exists a need in the art for an end cap which can be mounted to the control console without the need for additional fastening means.

SUMMARY OF THE INVENTION

In accordance with the invention, there is disclosed a one-piece end cap which is mounted to the control console of a domestic appliance without the use of additional fastening means.

The end cap according to the present invention provides mounting means for mounting the control console thereto. The mounting means include a plurality of inwardly directed mounting pins which vertically support the control console. The mounting pins extend into apertures provided at opposite ends of the control console, supporting the console therebetween. Adjacent the mounting pins are provided stop surfaces to limit the penetration of the mounting pins into the control console, thereby establishing a limit on the inward movement of the end caps relative to the control console.

The end cap of the present invention also provides retention means for securing the end cap to the control console. The retention means are resilient and include a plurality of paired arms, each of the arms including a terminal hooked end for attaching the control console to the end cap.

The hooked ends of the arms are resiliently snapped into apertures provided by the control console, causing shoulder surfaces provided by the hooked ends to engage an inside surface of the control console. The engagement of the shoulder surfaces with the inside surface of the control console prevents removal of the retention means from the control console and defines a limit on the outward movement of the end cap relative to the control console.

The stop surfaces and shoulder surfaces of the end cap define first and second generally parallel planes, the distance between the planes being generally equal to the thickness of the control console. The control console is trapped between the stop surfaces and the shoulder surfaces and the end caps are thereby prevented from inward or outward movement relative to the control console.

The end caps of the present invention are quickly and easily attached to the control console without the need for additional fastening means, eliminating approximately twelve pieces of hardware, and the labor associated therewith, from the end cap assembly currently employed by the assignee of the present invention.

BRIEF DESCRIPTION OF THE DRAWING FIGURES

The present invention will be more fully described hereafter with reference to the drawing figures, wherein:

FIG. 1 is a perspective view of a domestic appliance incorporating the present invention;

FIG. 2 is an exploded perspective view of the end cap and control console according to the present invention;

FIG. 3 is a front elevational view of the end cap according to the present invention;

FIG. 4 is a side elevational view of the end cap according to the present invention;

FIG. 5 is a cross-sectional view of an end mounting member according to the present invention taken along line 5—5 of FIG.

FIG. 6 is a cross-sectional view of a retention means according to the present invention taken along line 6—6 of FIG. 3; and FIG. 7 is a cross-sectional view of the center mounting member according to the present invention taken along line 7—7 of FIG. 3.

DETAILED DESCRIPTION OF THE PREFERRED EMBODIMENT

With reference to the drawing figures and, in particular FIG. 1, there is shown a domestic washing machine 2 incorporating the end caps 4 of the present invention. In the conventional manner, the washing machine 2 includes a generally square, boxlike cabinet structure 6 with an upwardly opening cavity closed by a door 8. Behind the door, at the top of the appliance cabinet 6 is provided a control panel 10. The machine controls 12, which are manually adjusted by the operator to control the various operations and functions of the machine 2, are located on the control panel 10, as is common in the art.

Immediately underneath the control panel 10 is provided a control console 14 to which the controls 12 are mounted. The control console 14 itself is attached to the cabinet 6 by means of the end caps 4. The control console 14 provides a generally planar front surface and downturned end portions 16. The downturned ends 16 provide a plurality of circular holes 18 and rectangular apertures 20 to allow insertion and retention of the end caps 4, as will be described hereafter. Since the end-caps 4 on either end of the control console are mirror images of one another, only one of the end caps will be described, it being understood that the description holds true for the other end cap as well.

With reference to FIGS. 2-4, the end cap 4 of the present invention provides cabinet engaging tongues 22, console retention means 24, console mounting means which comprise end and center mounting members 26, 28, and self-threading back panel mounting bosses 30. The self-threading bosses 30 are provided to facilitate attachment of the back panel closure (not shown) to the end cap 4. The cabinet engaging tongues 22 are designed and adapted to be received within slots (not shown) provided by the appliance cabinet 6 to positively mount the end cap 4 thereto. A diagonally oriented aperture 32 is also provided by the end cap 4 to receive a threaded fastener, such as a screw, which serves as an additional fastening means between the end cap 4 and the cabinet 6, as is generally well known in the art.

The mounting means and, more specifically, the end and center mounting members 26, 28 of the end cap 4 vertically support the control console 14. The mounting members 26, 28 include a base portion 34 and an inwardly extending mounting pin 36. The mounting pin 36 extends out of the top of the base portion 34, which also defines a stop surface 38. The preferred embodiment of the base portion 34 and, hence, the stop surface 38, provides a series of outstretched arms 40 generally arranged in the shape of a cross.

As illustrated in FIGS. 4, 5 and 7, the mounting pin 36 of the center mounting member 28 is substantially shorter than the mounting pin 36 of the end mounting members 26, the center mounting member 28 generally providing an end cap centering function to properly position the end cap 4 relative to the control console 14. The mounting pins 36 are received by the circular holes 18 in the control console 14. The stop surfaces 38 contact the outer surface of the downturned end 16 and thereby limit the inward penetration of the pins 36 into the console 14 as well as the inward movement of the end cap 4 relative to the control console 14.

As best shown in FIGS. 3, 4 and 6, the retention means 24 includes a plurality of paired inwardly extending resilient arms 42. The arms 42 provide enlarged, hook-shaped ends 46 which attach the end cap 4 to the control console 14. The hook-shaped ends 46 include shoulder surfaces 48 which contact the inner surface of the downturned portion 16 of the console 14 to prevent or at least inhibit removal of the retention means 24 from the rectangular aperture 20 once installed therein. The arms 42 are designed so that they may be snap fit into the rectangular apertures 20 provided by the downturned end 22 of the control console 14, as will be described hereafter.

As shown best in FIG. 4, the stop surfaces 38 provided by the end and center mounting means 26, 28 define a first plane A. Similarly, the shoulder surfaces 48 provided by the hook-shaped ends 46 of the resilient arms 42 define a second plane B. The distance between the first plane A and the second plane B is labelled D and is generally equal to the predetermined thickness of the downturned end portion 16 of the control console 14.

Engagement of the end cap 4 to the control console 14, and the attachment of the combination to the appliance cabinet 6, will be hereafter described with reference to the foregoing description and drawings.

The control console 14 is initially positioned such that the mounting pins 36 are immediately adjacent and in line with the circular holes 18 provided by the downturned end 16 of the console. The end cap 4 is thereafter moved towards the control console 14, inserting the mounting pins 36 into the holes 18. Simultaneously, the resilient arms 42 of the retention means 24 are inserted into the rectangular apertures 20 provided by the end 16 of the control console 14. The terminal hook-shaped ends 46 provided by the resilient arms 42 of the retention means 24 engage opposite sides of rectangular aperture 20 and deform relatively towards each other to permit insertion of the resilient arms into the aperture.

While the stop surface 38 approaches the outer surface of the downturned end 16, the shoulder surface 48 of the engaging means 44 nears the aperture 20 in the end 16. As the stop surfaces 38 engage the outer surface of the downturned end 16 to limit penetration of the mounting means 18 into the control console 14, the hook-shaped ends 46 pass through the rectangular apertures 20 and the arms 42 resiliently move away from each other, snapping into place and thereby causing the shoulder surfaces 48 to engage the inner surface of the end 16. Therefore, since the distance D between the first plane A defined by the stop surfaces 38 and the second plane B defined by the shoulder surfaces 48 is generally equal to the predetermined thickness of the downturned end 16 of the control console 14, the end of the control console 14 is trapped between the stop surfaces 38 and the shoulder surfaces 48.

Once both end caps 4 are so installed on the control console 14, the combination is installed on the cabinet 6 by sliding the tongues 22 into the grooves (not shown) provided by the cabinet 6. Thereafter, a threaded fastener is inserted through the diagonal aperture 32 provided by each end cap 4 and fastened to the top of the cabinet 6. Later in the assembly process the back panel (not shown) is attached to the end caps 4 by means of conventional fasteners and the provided self-threading bosses 30.

Naturally, the specific shape and length of the mounting means 18 and other features of the invention discussed herein are only meant to be illustrative of the preferred embodiment as presently contemplated by the inventor of the present invention, and are not to be construed in a limitative manner. It is clear that there are numerous means of performing the present invention which are equivalent to those described herein. For example, it is well within the scope of the invention for the retention means to comprise a plurality of single arms, wherein each of the arms has either one or two shoulder surfaces for engaging the inner surface of the downturned end adjacent the rectangular aperture. Moreover, the size and shape of the apertures can be adjusted to meet various design considerations. Also, the shoulder surfaces and stop surfaces can be formed on the same member. For example, the stop surfaces could be formed along the resilient arm beneath the shoulder surface a distance equal to the predetermined thickness of the control console. Therefore, the foregoing description of the invention is merely illustrative or exemplary, the true scope of the invention being only defined by the appended claims.

What is claimed is:

1. A snap fit end cap for an appliance control console, said control console extending between a pair of end caps and having a generally planar front face and a pair of lateral end portions being generally perpendicular to said front face, said end portions having a predetermined thickness, said end cap comprising:

means for securing the end cap to a top wall portion of an appliance cabinet;

a stop surface for limiting inward movement of the end cap relative to the control console end portion, said stop surface defining a first plane; and, means for retention of said end cap on said control console end portion, said retention means engaging an inner surface of said control console to inhibit outward movement of said end cap relative to said control console, said retention means defining a second plane generally parallel to said first plane, wherein a distance between said first and second planes is generally equal to the predetermined thickness of the control console end portion whereby said end portion is trapped between said stop surface and said retention means and said end cap is thereby inhibited from moving relatively toward or away from said control console.

2. An end cap according to claim 1, further comprising:

means for mounting said control console to said end cap, said mounting means including a plurality of mounting pins, said mounting pins extending through apertures provided by said control console end portion to vertically support said control console.

3. An end cap according to claim 2, wherein said stop surface is provided by said mounting means, said stop surface engaging an outer surface of said control console end portion and thereby limiting the penetration of said mounting pins into said control console end portion.

4. An end cap according to claim 3, wherein said retention means comprise an inwardly extending arm, said arm including a shoulder surface which engages the inner surface of said control console end portion to inhibit disengagement of said end cap therefrom.

5. An end cap according to claim 1, wherein said retention means includes an inwardly extending arm.

6. An end cap according to claim 5, wherein said arm includes a shoulder surface which engages the inner surface of said control console end portion to inhibit disengagement of the end cap from the control console, said shoulder surface defining said second plane.

7. A one piece, snap fit end cap for an appliance control console, said control console extending between a pair of said end caps and having a predetermined thickness, said end cap including downwardly extending tongues which are mountingly received by slots provided by a top wall portion of the appliance and a plurality of screw-receiving bosses for mounting of a rear panel closure thereto, said end cap comprising:

means for mounting said control console to said end cap which include a plurality of mounting pins, said mounting pins vertically supporting said control console, said mounting means further including a stop surface adjacent said mounting pins to limit the penetration of said mounting pins into said control console, said stop surface engaging an outer surface of said control console and thereby limiting relatively inward movement of said end cap toward said control console; and, means for retaining the end cap on the control console, said retention means being generally resilient and including a pair of arms, each of said arms having a terminal hooked end which includes a shoulder surface, the terminal hooked ends being resiliently snapped into an aperture provided by said control console, said shoulder surfaces engaging an inner surface of said control console and thereby inhibiting outwardly directed movement of said end cap and disengagement of said end cap from said control console, wherein said stop surface defines a first plane which is generally parallel to a second plane defined by said shoulder surfaces, a distance between said first and second planes being generally equal to the thickness of the control console whereby said control console is trapped between said shoulder surfaces and said stop surfaces and said end cap is thereby inhibited from moving relatively toward or away from said control console.

8. An end cap for mounting a control console to an appliance cabinet, said control console extending between a pair of end caps and having a generally planar front face and a pair of lateral end portions being generally perpendicular to said front face, said end portions having a predetermined thickness and said front face having mounted thereto means for controlling operation of said appliance, said end cap being adapted to mount the control console to a top wall portion of the appliance cabinet, said end cap comprising:

means for securing said end cap to the appliance cabinet, said securing means including downwardly extending tongues which are received by slots provided by the appliance cabinet top wall portion;

means for mounting the end portion of said control console to said end cap;

a stop surface for limiting inward movement of the end cap relative to the control console end portion, said stop surface defining a first plane;

means for retention of said end cap on the control console end portion, said retention means defining a second plane which is generally parallel to said first plane, wherein said first and second planes are spaced apart a distance generally equal to the predetermined thickness of the control console end portion whereby the end portion is trapped between the stop surface and the retention means and said end cap is thereby inhibited from moving relatively toward or away from said control console.

9. An end cap according to claim 8, wherein said mounting means includes a mounting pin, said mounting pin extending into and vertically supporting said control console.

10. An end cap according to claim 9, wherein said stop surface is provided by said mounting means adjacent the mounting pine, said stop surface engaging an outer surface of said control console end portion to limit the inward penetration of said mounting pin.

11. An end cap according to claim 10, wherein said retention means includes a resilient inwardly extending arm, said arm extending through an aperture in said control console end portion and providing a hook shaped terminal end.

12. An end cap according to claim 11, wherein said hook shaped end includes a shoulder surface, said shoulder surface engaging the inner surface of said control console end portion and defining said second plane.

* * * * *

UNITED STATES PATENT AND TRADEMARK OFFICE
CERTIFICATE OF CORRECTION

PATENT NO. : 5,358,323

DATED : October 25, 1994

INVENTOR(S) : Ripley, Brian

It is certified that error appears in the above-identified patent and that said Letters Patent is hereby corrected as shown below:

Column 1, line 12, delete "2Description" and insert --2. Description--.

Column 2, line 49, after "FIG." insert --3;--.

Column 6, line 64, (Claim 10, line 3), delete "pine" and insert --pin--.

Signed and Sealed this

Third Day of January, 1995

Attest:

BRUCE LEHMAN

*Attesting Officer*         *Commissioner of Patents and Trademarks*